United States Patent
Ramasamy et al.

(10) Patent No.: US 12,435,258 B2
(45) Date of Patent: Oct. 7, 2025

(54) ORGANOCLAY-FREE INVERT EMULSION OIL-BASED DRILLING FLUIDS WITH POLYHEDRAL OLIGOMERIC SILSESQUIOXANE

(71) Applicant: SAUDI ARABIAN OIL COMPANY, Dhahran (SA)

(72) Inventors: Jothibasu Ramasamy, Dhahran (SA); Vikrant Wagle, Dhahran (SA); Mohammad A. Otaibi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 2 days.

(21) Appl. No.: 17/827,273

(22) Filed: May 27, 2022

(65) Prior Publication Data

US 2023/0383167 A1    Nov. 30, 2023

(51) Int. Cl.
E21B 43/34    (2006.01)
C09K 8/36    (2006.01)

(52) U.S. Cl.
CPC .................... C09K 8/36 (2013.01)

(58) Field of Classification Search
CPC .............. C09K 8/03; C09K 8/36; E21B 43/34
USPC .......................................................... 175/65
See application file for complete search history.

(56) References Cited

U.S. PATENT DOCUMENTS

| | | | |
|---|---|---|---|
| 5,977,031 A * | 11/1999 | Patel | C09K 8/36 507/129 |
| 6,410,488 B1 * | 6/2002 | Fefer | C09K 8/34 507/904 |
| 7,013,998 B2 | 3/2006 | Ray et al. | |
| 8,936,111 B2 | 1/2015 | Maghrabi et al. | |
| 9,127,192 B2 | 9/2015 | Maghrabi et al. | |

(Continued)

FOREIGN PATENT DOCUMENTS

| | | |
|---|---|---|
| CN | 112708138 A | 4/2021 |
| WO | 2014164381 A1 | 10/2014 |
| WO | 2015006101 A1 | 1/2015 |

OTHER PUBLICATIONS

Liu, Xu, et al. "Rheological properties and core damage evaluation of a new type of supercritical CO2 fracturing fluid based on silicon-containing thickeners", Drilling Fluid & Completion Fluid, vol. 37, No. 2. Mar. 2020, pp. 250-256, [14 Pages].

(Continued)

*Primary Examiner* — William D Hutton, Jr.
*Assistant Examiner* — Ashish K Varma
(74) *Attorney, Agent, or Firm* — Osha Bergman Watanabe & Burton LLP

(57) ABSTRACT

A composition of an invert emulsion oil-based drilling fluid formulation includes an invert emulsion of an oil phase and an aqueous phase. The oil phase includes an oleaginous fluid and a liquid viscosifier that is a polyhedral oligomeric silsesquioxane (POSS). A method includes introducing an invert emulsion oil-based drilling fluid formulation including an oil phase, an aqueous phase, and a liquid viscosifier including POSS downhole through the wellbore and maintaining wellbore conditions such that the invert emulsion oil-based drilling fluid formulation provides a stable rheological property including one or more of viscosity, yield point, plastic viscosity, gel strength, and electrical stability for a period up to about 96 hours.

9 Claims, 2 Drawing Sheets

(56) References Cited

U.S. PATENT DOCUMENTS

| | | | |
|---|---|---|---|
| 9,181,470 B2 | 11/2015 | Nguyen et al. | |
| 2004/0072696 A1* | 4/2004 | Patel .................. | C09K 8/32 |
| | | | 507/100 |
| 2013/0303411 A1 | 11/2013 | Wagle et al. | |
| 2014/0096964 A1 | 4/2014 | Chakraborty et al. | |
| 2015/0024975 A1* | 1/2015 | Wagle .................. | C09K 8/36 |
| | | | 507/117 |
| 2016/0208157 A1 | 7/2016 | Vo et al. | |
| 2019/0225875 A1* | 7/2019 | Singh .................. | E21B 43/26 |

OTHER PUBLICATIONS

Second Examination Report issued in Saudis Arabian Application No. 123447148, dated Sep. 15, 2024 (6 pages).

* cited by examiner

ORGANOCLAY-FREE INVERT EMULSION OIL-BASED DRILLING FLUIDS WITH POLYHEDRAL OLIGOMERIC SILSESQUIOXANE

BACKGROUND

Drilling fluid including oil-based fluids, synthetic-based fluids, or water-based fluids may be introduced downhole when drilling a high pressure, high temperature (HPHT) section of a well. An HPHT well may have a temperature greater than 150 degrees Celsius (° C.) and a pressure that may exceed 10,000 pounds per square inch (psi). Under these conditions, oil-based and synthetic-based drilling fluids may thin out, whereas water-based fluids may thicken or gel.

Thus, invert emulsion drilling fluids may be introduced in HPHT sections of a well to maintain a desired rheology, without the thinning of oil-based and synthetic-based fluids, or the thickening of water-based fluids. An invert emulsion is an oil-based emulsion of an oil phase and an aqueous phase known as a water-in-oil emulsion.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a composition of an invert emulsion oil-based drilling fluid formulation including an invert emulsion of an oil phase and an aqueous phase. The oil phase includes an oleaginous fluid and a liquid viscosifier that is a polyhedral oligomeric silsesquioxane (POSS).

In another aspect, embodiments disclosed herein relate to a method including introducing an invert emulsion oil-based drilling fluid formulation that includes an oil phase, an aqueous phase, and a liquid viscosifier including POSS downhole through the wellbore and maintaining wellbore conditions such that the invert emulsion oil-based drilling fluid formulation provides a stable rheological property including one or more of viscosity, yield point, plastic viscosity, gel strength, and electrical stability for a period up to about 96 hours.

Other aspects and advantages of the claimed subject matter will be apparent from the following description and the appended claims.

DETAILED DESCRIPTION

Figure 1:
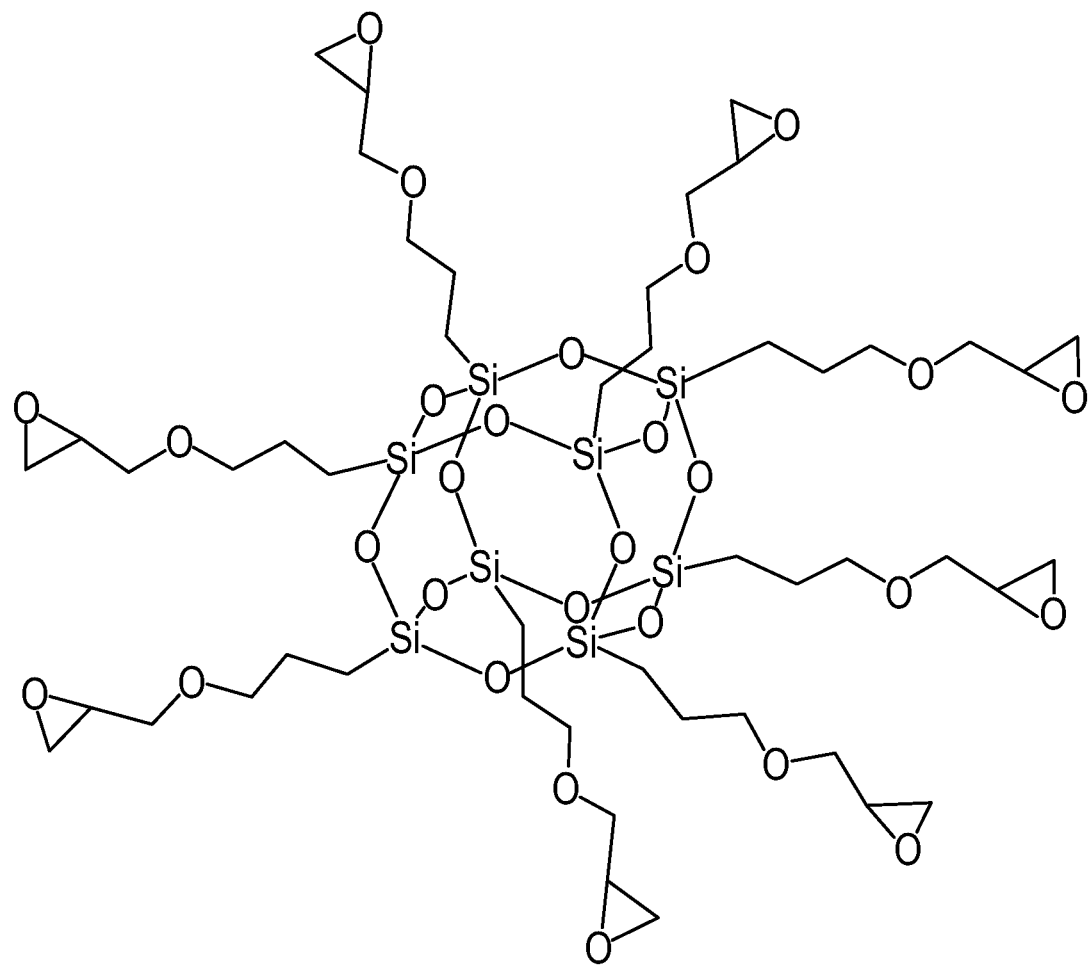
FIG. 1 depicts a structural formula of a glycidyl POSS, according to one or more embodiments.

In the following Detailed Description, numerous details provide a thorough understanding of the disclosure. However, one of ordinary skill in the art will find that the disclosure may be practiced without these details. Moreover, one or more well-known features are briefly detailed to avoid unnecessarily complicating the description. As used herein, fluids may refer to slurries, liquids, gases, or mixtures thereof. One or more embodiments are described merely as examples of useful applications, which are not limited to any specific details of the one or more embodiments herein.

One or more embodiments in accordance with the present disclosure generally relate to a drilling fluid ("mud") including polyhedral oligomeric silsesquioxane (POSS) as a rheology modifier (also known as a viscosifier). The drilling mud, uncharacteristically, does not include a solid viscosifier. One or more embodiments relate to invert emulsion oil-based drilling fluid formulation including POSS, and related methods that can improve yield point, low shear rheology, and electrical stability of these drilling fluids, among other things. "Low shear" means a shear rate measured at 3 rpm and 6 rpm as known to those of ordinary skill in the art. For example, a shear rate at 3 rpm and 6 rpm may be measured by using a FANN® model 35 viscometer.

In particular, when drilling formations at "HPHT" (high pressure, high temperature) conditions, such as a shale section of a formation at HPHT, an invert emulsion (water-in-oil or W/O emulsion) oil-based drilling fluid may be used to stabilize the reactive formation. "HPHT" or "high pressure/high temperature" in describing wellbore conditions may include a pressure of greater than or equal to 10,000 psi, a bottomhole or a section temperature of greater than or equal to 250° F., or a combination of both.

Notably, invert emulsion oil-based drilling fluids disclosed herein do not include a conventional viscosifier. Conventional viscosifiers (also referred to as "solid viscosifiers") may contain a high content of solids. When this high content of solids is added to the drilling fluid, formation or equipment damage may result. In addition, a conventional viscosifier under HPHT conditions may not maintain a desired rheological property when added to a drilling fluid. Failure to maintain a desired rheological property may result in solids settling, barite sagging, and cuttings build up within the drilling fluid or wellbore. A "desired rheological property" includes improved low shear rheology, according to one or more embodiments of the present disclosure (such as improved low shear rheology when using a composition with a POSS compared to low shear rheology when using a composition with a conventional viscosifier). Low shear rheology may include one or more rheological property according to one or more embodiments of the present disclosure, especially in high density muds. As used herein, "low shear rheology" refers to a property of the mud when the agitation or shear rate is low, for example, as measured by using a FANN® model 35 viscometer at 3 or 6 RPM. As may be appreciated by those skilled in the art, while the low shear rheological properties are described in detail in the present disclosure, improvements in rheological properties at higher shear rates may also be achieved by the compositions disclosed herein.

An improved low shear rheology may include having a viscosity of from 0.1 to 50 centipoise (cP) (at 6 rpm) and a viscosity of from 0.05 to 25 cP (at 3 rpm). In addition, low shear rheology may include a yield point in a range from 1 to 100 pounds per hundred square feet (lb/100 ft$^2$); a plastic viscosity in a range from 20 to 150 cP; a 10 second (sec.) gel strength may be in a range from 0.1 to 30 lb/100 ft$^2$; a 10 minute (min.) gel strength in a range from 0.1 to 50 lb/100 ft$^2$; and an electrical stability in a range from 100 to 700 volts.

Composition: Invert Emulsion Oil-Based Drilling Fluid Formulation

In one or more embodiments, the composition includes an invert emulsion oil-based drilling fluid formulation that includes a POSS.

An invert emulsion oil-based drilling fluid formulation may comprise an oil phase including an oleaginous fluid such as crude oil, condensates, light hydrocarbon liquids, fractions thereof, derivatives thereof, and others. In one or more embodiments, the oil phase may include a dearomatized mineral oil. An example of a dearomatized mineral oil is Safra oil (SaudiSol, Gulf Chemicals and Industrial Oils Co., Saudi Arabia). In one or more embodiments, Safra oil ranges from 60 to 95 vol % of the overall composition volume (volume expressed in barrels).

An invert emulsion oil-based drilling fluid formulation includes an inverted phase, called an aqueous phase. The water of the aqueous phase may be any form of water, including, but not limited to, deionized water; filtered or raw fresh waters; mineral waters; filtered, raw or synthetic seawater; brackish water; synthetic or natural brines; salt water; formation water; and produced water. The water may contain an amount of organics from natural or artificial sources as long as the function of the composition, which is to provide the invert emulsion, is not inhibited. The water may contain an amount of minerals or metals from natural or artificial sources as long as the function of the composition is not inhibited. The water may contain an amount of monovalent ions, multivalent ions, and combinations thereof.

In one or more embodiments, the aqueous phase is a brine, such as a calcium chloride anhydride-based brine. The brine may be in a range of 1 to 50 vol %, or of 5 to 40 vol % compared to the total volume of the drilling fluid formulation.

As previously mentioned, the invert emulsion oil-based drilling fluid formulation may include a POSS. In one or more embodiments, the POSS is a liquid viscosifier. The POSS has an inorganic silicate (silsesquioxane) core, including Si—O—Si linkages.

The POSS can have the average unit formula [R$^1$SiO$_{1.5}$], where one or more R$^1$SiO$_{1.5}$ unit in the POSS includes an R group ("R$^1$"). The repeating unit of the POSS can have the structure:

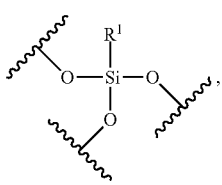

(Formula I)

where silicon-bonded oxygen is bonded to another silicon atom, a hydrogen atom (for example, silanol), or to an independently selected R$^1$ as will be defined. The POSS can have a total number of [R$^1$SiO$_{1.5}$] units selected from the group consisting of 6, 8, 10, and 12 and thus a corresponding number of R groups. In one or more embodiments, the POSS has 8 [R$^1$SiO$_{1.5}$] units. The POSS can be any suitable POSS. The POSS can be a partially or fully caged. In one or more embodiments, the POSS is fully caged, that is, the tetrahedral vertex of the POSS (polyhedron) can be occupied by a silicon atom, and the edge of the polyhedron can be formed by an Si—O unit or repeating units of Si and O, including Si—O—Si.

The POSS can include three or more sides, with the three or more sides having a different plane, and with the three or more sides defined as interconnected R$^1$SiO$_{1.5}$ units, having the structure:

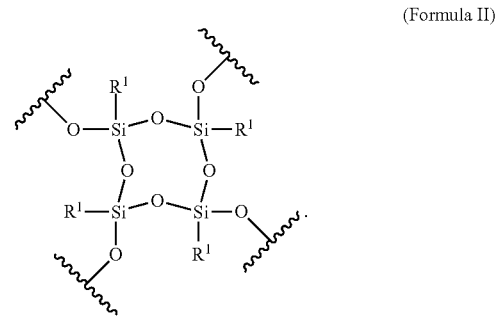

(Formula II)

In one or more embodiments, the POSS epoxy resin has six sides like that of a cube and is therefore "fully caged".

The POSS includes one or more different compositions of POSS. In one or more embodiments, the POSS can have a structure:

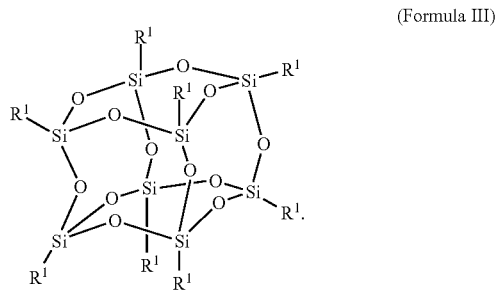

(Formula III)

In one or more embodiments, the POSS is a glycidyl POSS. A glycidyl POSS is shown in FIG. 1 as a first-generation dendrimer. Glycidyl POSS includes a silsesquioxane core as a cage. An organic substituent (R group, or R$^1$) attaches to a silica atom at one or more tetrahedral vertex of the cage. In one or more embodiments, the R$^1$ groups for the POSS are the same. An organosilicon bond (Si—C) binds the organic substituent to the POSS. In one or more embodiments, the organic substituent is a glycidyl functional group having formula R—CH$_2$—CH$_2$—CH$_2$—O—CH$_2$—C$_2$H$_3$O bound to the tetrahedral vertices of the cage. "—C$_2$H$_3$O" is a terminal epoxide. The glycidyl functional group is otherwise known as an n-propyl glycidyl ether that is functionalized at the n-propyl terminus. In one or more embodiments, the glycidyl POSS is a liquid. Glycidyl POSS (CAS number 68611-45-0) is produced by Hybrid Plastics, USA.

The POSS may be included in a concentration of 0.1 to 10 pounds per barrel in the drilling fluid formulation.

As noted above, the composition does not include a solid or conventional viscosifier. As used herein, a "solid viscosifier" may be a solid or a mixture of a solid with a liquid. If in the form of a mixture of a solid with a liquid, the mixture may be a suspension of the solid in the liquid. Solid viscosifiers may be organophilic clay-based viscosifiers that may further include silica, for example, crystalline silica (quartz). An example of a commercially available solid viscosifier is GELTONE® II (Halliburton, USA), produced by Halliburton, USA.

In one or more embodiments, an invert emulsion oil-based drilling fluid formulation may comprise one or more additives. The additive may include but is not limited to a weighting agent, a friction reducer, a filtration control agent, an emulsion activator, a primary emulsifier, a secondary emulsifier, and combinations thereof. Such additives and combinations thereof are known in the art.

A weighting agent refers to finely divided solid material that is used to increase the density of the invert emulsion oil-based drilling fluid formulation. Non-limiting examples of weighting agents include aragonite, bentonite, barite, barium chloride, barium hydroxide, barium oxide, barium sulfate, calcite, calcium carbonate, dolomite, hematite, ilmenite, iron carbonate, iron oxides, lead carbonate, manganese oxides, siderite, zinc carbonate, zinc oxide, zirconium oxide, and other various minerals. In one or more embodiments, the additive includes barite or manganese tetroxide as a weighting agent.

In one or more embodiments, the weighting agent is provided in a concentration range of from 0.5 to 300 parts per billion (ppb) in the overall composition.

A filtration control agent that may be added in the invert emulsion oil-based drilling fluid formulation may include but is not limited to modified lignites, asphalts, gilsonites, polymeric fluids, and combinations thereof. In one or more embodiments, the additive includes VERSATROL® (Schlumberger, USA) as a filtration control agent.

In one or more embodiments, the filtration control agent is provided in a concentration range of from 0.1 to 20 ppb.

An emulsion activator refers to a component that activates the emulsifier, which then stabilizes the emulsion and aids in the formation of the invert emulsion. The emulsion activator may include but is not limited to a lime-based activator.

In one or more embodiments, the primary emulsifier is basic (pH greater than 7.0, a "basic emulsifier"). In one or more embodiments, the primary emulsifier is a blend of fatty acid and hydrocarbons, such as VERSAMUL® (Schlumberger, USA). The hydrocarbon blend may include mineral oil, petroleum distillates, and raffinates. The primary emulsifier is added to an invert emulsion oil-based drilling fluid (mud) formulation to emulsify water in oil and to uniformly distribute water droplets. One of ordinary skill in the art will appreciate other known examples of (primary or secondary) emulsifiers. The primary emulsifier concentration is 0.1 to 30 ppb of the total composition.

An emulsifier may be a component used in producing an oil-based or synthetic oil-based drilling fluid that forms an invert emulsion. An emulsifier may lower the interfacial tension between oil and water. For example, emulsifiers may be a primary emulsifier or a secondary emulsifier, where the secondary emulsifier may be used alone or in combination with another emulsifier in producing an invert emulsion. Emulsifiers may include calcium fatty-acid soaps made from various fatty acids, and/or derivatives such as amides, amines, amidoamines and imidazolines made by reactions of fatty acids, and various ethanolamine compounds.

In one or more embodiments, the secondary emulsifier is VERSACOAT® (Schlumberger, USA). The secondary emulsifier concentration is 0.1 to 30 ppb of the total composition.

Method

One or more embodiments of the present disclosure describe a method of introducing an invert emulsion oil-based drilling fluid formulation into a wellbore.

The formulation according to one or more embodiments may be mixed before being injected into a wellbore as shown in Table 1. The invert emulsion oil-based drilling fluid formulation may be stored for up to one week in a laboratory setting and a longer time period in the field. The invert emulsion oil-based drilling fluid formulation may also be recycled for reuse.

The formulation may then be introduced into a wellbore where one or more sections thereof may be at HPHT conditions ("HPHT section"). Wellbore conditions may be maintained for a period of time. The period of time may be up to about 96 hours, about 72 hours, about 48 hours, about 24 hours, about 20 hours, about 18 hours, and about 16 hours. "Maintaining wellbore conditions" relating to drilling fluid means that drilling operations may proceed, stop, or stop and resume. In this instance, drilling operations may include but are not limited to pumping, circulating, pressurizing, depressurizing, drilling, removing cuttings, sealing, cooling, lubricating, transmitting energy (hydraulic and otherwise), maintaining wellbore stability, and other techniques known in the art.

While maintaining wellbore conditions, the formulation may provide a rheological property of the invert emulsion oil-based drilling fluid that may be stable for the duration of the previously described step where wellbore conditions are maintained. The rheological property of the drilling fluid may include but is not limited to viscosity at one or more shear rate, yield point ("YP"), plastic viscosity ("PV"), gel strength, electrical stability, and combinations thereof. The time period that the formulation will maintain the rheological property of the drilling fluid is 12-24 hours or more. An invert emulsion mud may be stable for a period of days, where stability relates to maintaining the rheological property of the drilling fluid.

For example, as measured by a Fann 30 viscometer, embodiment drilling fluids may have a viscosity ranging from 20 to 300 centipoise (cP) at a shear rate of 600 rpm. In one or more embodiments, at a shear rate of 600 rpm, drilling fluid compositions have a viscosity having a lower limit of any of 20, 30, 40, 50, 60, 70, and 80 cP and an upper limit of any of 180, 200, 220, 240, 260, 280, and 300 cP, where any lower limit may be paired with any mathematically compatible upper limit. At a shear rate of 300 rpm, embodiment drilling fluids may have a viscosity ranging from 20 to 250 cP. For example, at a shear rate of 300 rpm, drilling fluids may have a viscosity having a lower limit of any of 20, 30, 40, 50, 60, 70 and 80 cP and an upper limit of any of 150, 170, 190, 200, 230, and 250 cP, where any lower limit may be paired with any mathematically compatible upper limit. At a shear rate of 200 rpm, embodiment drilling fluids may have a viscosity ranging from 10 to 200 cP. For example, in one or more embodiments, at a shear rate of 200 rpm, drilling fluids may have a viscosity having a lower limit of any of 10, 20, 30, 40, 50 and 60 cP, and an upper limit of any of 150, 160, 170, 180, 190, and 200 cP, where any lower limit may be paired with any mathematically compatible upper limit. At a shear rate of 100 rpm, embodiment drilling fluids may have a viscosity ranging from 5 to 150 cP. For example, at 100 rpm, drilling fluids of one or more embodiments may have a viscosity having a lower limit of any of 5, 10, 15, 20, 25, and 50 cP and an upper limit of any of 100, 110, 120, 130, 140, and 150 cP, where any lower limit may be paired with any mathematically compatible upper limit. At a shear rate of 6 rpm, embodiment drilling fluids may have a viscosity ranging from from 0.1 to 50 cP. For example, at 6 rpm, drilling fluids of one or more embodiments may have a viscosity having a lower limit of any of 0.1, 0.5, 1.0, 2.0, 3.0, and 5.0 cP, and an upper limit of any of 10, 20, 30, 40 and 50 cP, where any lower limit may be paired with any mathematically compatible upper limit. At a shear rate of 3 rpm, embodiment drilling fluids may have a viscosity ranging from a lower limit of any of 0.05, 0.1, 0.2, 0.5, 0.8, and 1.0 cP, and an upper limit of any of 5.0, 10, 15, 20, and 25 cP, where any lower limit may be paired with any mathematically compatible upper limit.

In addition, a yield point (YP) may be in a range from 1 to 100 pounds per hundred square feet (lb/100 ft$^2$). A plastic viscosity (PV) may be in a range from 20 to 150 cP. The YP and PV may be calculated using measured viscosity values. For example, the PV may be calculated according to the following formula: PV=600 rpm viscosity−300 rpm viscosity. Likewise, the YP may be calculated based on the PV, according to the following formula: YP=PV−300 rpm viscosity. A 10 second (sec.) gel strength may be in a range from 0.1 to 30 lb/100 ft$^2$. A 10-minute (min.) gel strength may be in a range from 0.1 to 50 lb/100 ft$^2$. An electrical stability, as measured by an electrical stability meter, may be in a range from 100 to 700 volts.

EXAMPLES

Several formulations according to one or more embodiments were prepared, as shown in Table 1. Comparative Example 1 (CE1) (formulation 1) includes 4 grams of solid viscosifier (GELTONE® II) and Examples 1 and 2 include 4 mL and 3 mL of POSS, respectively, (Table 1) and are used to compare formulations with and without glycidyl POSS.

Formulations 1 to 3 were mixed and hot rolled at about 176° C. (350° F.) and 500 psi for 16 hours. This temperature and pressure simulates HPHT conditions. A benchtop mixer at 11500 revolutions per minute (rpm) was used for the mixing.

After subjecting the formulations to HPHT conditions, the formulations were cooled to about 48° C. (120° F.). Next, rheological measurements were taken and are shown in Table 2.

TABLE 2

Rheological properties of formulations.

| | Formulation 1, CE1 | Formulation 2, Example 1 | Formulation 3, Example 2 |
|---|---|---|---|
| 600 rpm reading | 129 | 104 | 95 |
| 300 rpm reading | 69 | 56 | 50.2 |
| 200 rpm reading | 46.6 | 38.5 | 34.2 |
| 100 rpm reading | 24 | 20.4 | 17.7 |
| 6 rpm reading | 1.6 | 1.4 | 1.2 |
| 3 rpm reading | 1 | 0.9 | 0.8 |
| PV (plastic viscosity) | 59.8 | 45.5 | 42.4 |
| YP (yield point) | 6.4 | 7.4 | 5.3 |
| LSYP (low shear yield point) | 1.4 | 1.3 | 1.2 |
| 10 sec. gel strength | 0.8 | 0.6 | 0.5 |
| 10 min. gel strength | 0.5 | 13.9 | 11 |
| Electrical stability | 357 | 447 | 428 |

FIGS. 2A-2D depict data from Table 2, show the change in plastic viscosity, yield point, low shear yield point, and electrical stability of the formulations with and without glycidyl POSS.

Figure 2A:
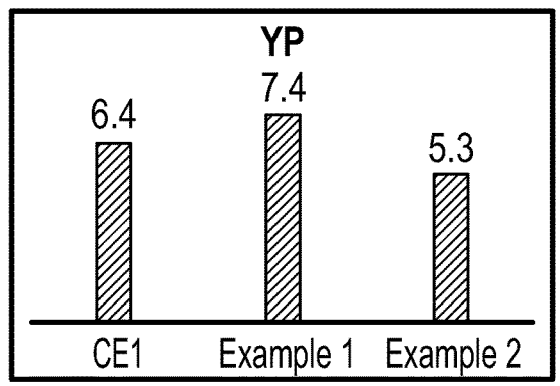
FIG. 2A shows yield point of CE1 (formulation 1) and Examples 1 and 2 (formulations 2 and 3, respectively) in graphical format, according to one or more embodiments.
Figure 2B:
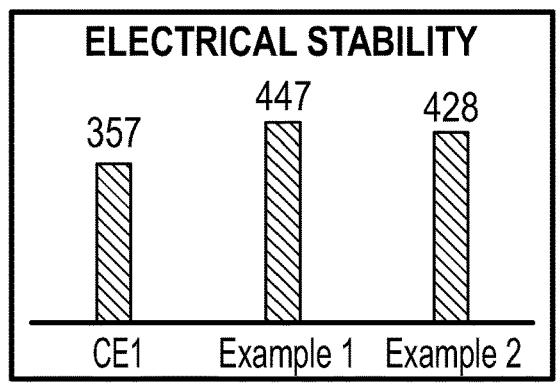
FIG. 2B shows electrical stability of CE1 (formulation 1) and Examples 1 and 2 (formulations 2 and 3, respectively) in graphical format, according to one or more embodiments.

The YP increased from 6.4 to 7.4 lb/100 ft$^2$ with a liquid viscosifier (glycidyl POSS) in Example 1 compared to CE1 with an organoclay viscosifer (FIG. 2A). Likewise, the low electrical stability was improved in Examples 1 and 2, including a POSS viscosifier, compared to CE1, with an organoclay viscosifier (FIG. 2B).

Figure 2C:
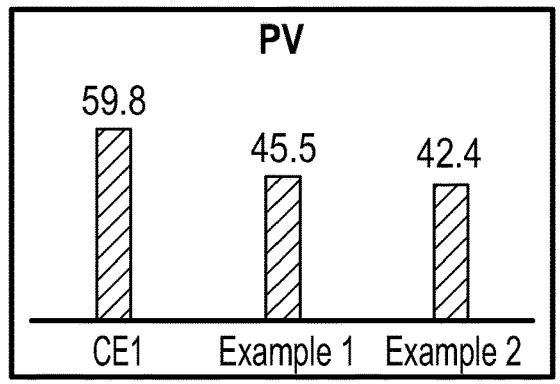
FIG. 2C shows plastic viscosity of CE1 (formulation 1) and Examples 1 and 2 (formulations 2 and 3, respectively) in graphical format, according to one or more embodiments.
Figure 2D:
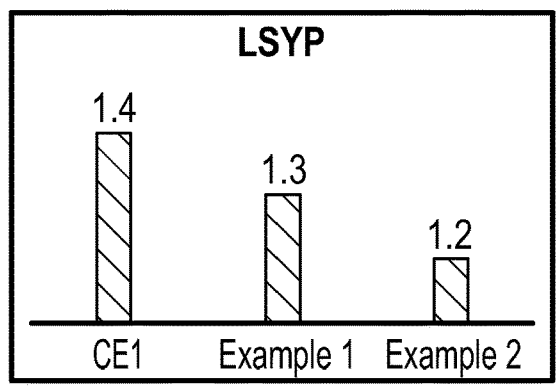
FIG. 2D shows low shear yield point of CE1 (formulation 1) and Examples 1 and 2 (formulations 2 and 3. respectively) in graphical format, according to one or more embodiments.

The PV and LYSP of Examples 1 and 2 (with a POSS viscosifier) are similar to those of CE1 (with an organoclay viscosifier) (Table 2, FIGS. 2C and 2D). Thus, the invert

TABLE 1

Oil-Based Drilling Fluids with POSS

| Component | Detail | Formulation 1, CE1 | Formulation 2, Example 1 | Formulation 3, Example 2 | Vol-% of total volume % | Mixing time (mins) |
|---|---|---|---|---|---|---|
| Oil phase | Safra oil | 161.3 mL | 161.3 mL | 161.3 mL | 50.2% | — |
| Primary emulsifier | VERSAMUL® | 8 mL | 8 mL | 8 mL | 2.5% | 5 |
| Secondary emulsifier | VERSACOAT® | 4 mL | 4 mL | 4 mL | 1.25% | 5 |
| Emulsion activator | Lime | 6 g | 6 g | 6 g | 0.84% | 20 |
| Solid viscosifier | GELTONE® II | 4 g | 0 g | 0 g | 0.78% | 5 |
| Liquid viscosifier | POSS (1.25 g/mL density) | 0 mL | 4 mL | 3 mL | 0.93% | 5 |
| Filtration control agent | VERSATROL® | 6 g | 6 g | 6 g | 1.78% | 20 |
| Inverted phase | Brine (DI water 50.65 mL + CaCl$_2$ anhydrous 21.25 g) | 72 mL | 72 mL | 72 mL | 19.6% | 5 |
| Weighting agent | Barite | 280 g | 280 g | 280 g | 19.6% | 5 |
| Friction reducer | REV DUST™ | 20 g | 20 g | 20 g | 2.5% | 20 | emulsion drilling muds with glycidyl POSS as a viscosifier provides similar and/or improved rheological properties compared to CE1, including an organoclay viscosifier, while eliminating the associated solid content.

Accordingly, improved rheological properties have been observed for drilling fluid formulations including a glycidyl POSS and as compared to the same formulations with a conventional organoclay-based viscosifier. Further, drilling fluid formulations with low loadings of glycidyl POSS, from 0.1 to 1 ppb, or about 0.5 ppb, provide similar and improved rheological.

Unless defined otherwise, all technical and scientific terms used have the same meaning as commonly understood by one of ordinary skill in the art to which these systems, apparatuses, methods, processes, and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

The term "substantially", when used, refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it should be understood that another embodiment is from the one particular value to the other particular value, along with all particular values and combinations thereof within the range.

Although only a few example embodiments have been described in detail, those skilled in the art will readily appreciate that many modifications are possible in the example embodiments without materially departing from this disclosure. All modifications of one or more disclosed embodiments are intended to be included within the scope of this disclosure as defined in the following claims. In the claims, means-plus-function clauses are intended to cover the structures previously described as performing the recited function, not limited to structural equivalents, but also equivalent structures. It is the express intention of the applicant not to invoke 35 U.S.C. § 112(f) for any limitations of any of the claims, except for those in which the claim expressly uses the words 'means for' together with an associated function.

While one or more embodiments of the present disclosure have been described with respect to a limited number of embodiments, those skilled in the art, having benefit of this disclosure, will appreciate that other embodiments can be devised, which do not depart from the scope of the disclosure. Accordingly, the scope of the disclosure should be limited only by the attached claims.

What is claimed:

1. A composition of an invert emulsion oil-based drilling fluid formulation comprising:
   an invert emulsion of an oil phase and an aqueous phase, the oil phase including an oleaginous fluid; and
   a liquid viscosifier that is a polyhedral oligomeric silsesquioxane (POSS), wherein the POSS is included in the invert emulsion oil-based drilling fluid formulation in an amount ranging from 0.1 to 10 pounds per barrel.

2. The composition of claim 1, wherein the oleaginous fluid includes a dearomatized mineral oil.

3. The composition of claim 2, wherein the dearomatized mineral oil is Safra oil.

4. The composition of claim 1, wherein the aqueous phase is a calcium chloride anhydride-based brine.

5. The composition of claim 1, wherein the POSS is a glycidyl POSS.

6. The composition of claim 1, further comprising one or more selected from the group consisting of a weighting agent, barite, a friction reducer, a filtration control agent, an emulsion activator, a primary emulsifier, and a secondary emulsifier.

7. The composition of claim 6, wherein the primary emulsifier comprises a fatty acid and a hydrocarbon.

8. The composition of claim 6, wherein the primary emulsifier is a basic emulsifier.

9. The composition of claim 1, wherein the composition does not include a solid viscosifier.

\* \* \* \* \*